United States Patent
Milobinski et al.

(10) Patent No.: US 6,671,873 B2
(45) Date of Patent: Dec. 30, 2003

(54) PROBLEMATIC BINARY ISOLATOR

(75) Inventors: Cigdem Y. Milobinski, Scappoose, OR (US); David L. Kreitzer, Hillsboro, OR (US); Max W. Gravitt, Morrisville, NC (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 09/737,533

(22) Filed: Dec. 13, 2000

(65) Prior Publication Data

US 2002/0108105 A1 Aug. 8, 2002

(51) Int. Cl.[7] ............................... G06F 9/44
(52) U.S. Cl. .................. 717/124; 717/126; 717/127; 717/128; 717/129; 717/130; 714/38; 714/48; 714/52; 709/332
(58) Field of Search ............... 717/126–130, 717/124, 140; 714/100, 52, 48, 38; 709/332; 707/103 Z

(56) References Cited

U.S. PATENT DOCUMENTS

| | | | | |
|---|---|---|---|---|
| 4,694,420 A | * | 9/1987 | Pettet et al. | 717/131 |
| 4,696,007 A | * | 9/1987 | Moriyama | 714/752 |
| 5,175,856 A | * | 12/1992 | Van Dyke et al. | 717/151 |
| 5,742,754 A | * | 4/1998 | Tse | 714/38 |
| 5,966,541 A | * | 10/1999 | Agarwal | 717/132 |
| 6,178,548 B1 | * | 1/2001 | Hickman et al. | 717/124 |
| 6,226,786 B1 | * | 5/2001 | Hickman et al. | 717/124 |
| 6,305,010 B2 | * | 10/2001 | Agarwal | 717/126 |
| 6,378,087 B1 | * | 4/2002 | Flanagan et al. | 714/38 |
| 6,418,444 B1 | * | 7/2002 | Raduchel et al. | 707/103 Z |
| 6,560,757 B1 | * | 5/2003 | Ballam | 716/5 |
| 6,601,114 B1 | * | 7/2003 | Bracha et al. | 709/332 |
| 6,601,203 B1 | * | 7/2003 | Asano et al. | 714/738 |

OTHER PUBLICATIONS

TITLE: Abstract debugging of higher-order imperative languages, author: Bourdoncle, ACM, 1993.*
TITLE: Compiling a Functional Language, author: Cardelli, ACM, 1984.*
TITLE: Recovery of Jump Table Case Statements from Binary Code, author: Cifuentes et al, IEEE, 1999.*
TITLE: Binary Translation, author: Sites et al, ACM, 1993.*

* cited by examiner

*Primary Examiner*—Chameli C. Das
(74) *Attorney, Agent, or Firm*—Blakely, Sokoloff, Taylor & Zafman LLP

(57) ABSTRACT

An automated method for determining problematic binary files. A group of source code files is compiled using two different compiling environments. One of the compiling environments yields a failing set of binary files (i.e., the resultant executable program exhibits problematic behavior). The other compiling environment yields a passing set of binary files (i.e., the resultant executable program does not exhibit problematic behavior). Complementary sets of files, containing some passing files and some failing files, are used to create test executable programs. The test executable programs are evaluated against pass/fail criteria. The results of these evaluations are used to isolate the problematic binary file or set of files. The process is continued iteratively until the problematic file is determined. According to one embodiment the two compiling environments may be different modes of a given compiler. In one embodiment an algorithm is used to select the passing files and failing files used to create the test executable program. The algorithm is capable of determining two or more files, the interaction of which, causes the test executable program to fail.

15 Claims, 5 Drawing Sheets

PROBLEMATIC BINARY ISOLATOR

FIELD OF THE INVENTION

The present invention relates generally to computer program compiling and debugging, and more specifically to an automated system for determining the file or set of files that cause a program run-time failure and/or performance problem when complied with a particular compiler, or compiled in a particular manner.

BACKGROUND

The need for computer programs with greater functionality is increasing dramatically and with added functionality of computer programs comes added complexity. It is not uncommon today for a computer program to contain hundreds or even thousands of source code files. Computer program compilers are used to transform these source code files to machine-readable files (e.g., executable files). There are many varieties of compilers available for different languages and from different manufacturers. Often times a computer programmer may wish to take a set of source code files already compiled on one type of compiler and compile the same source code files on another interoperable compiler. This may be desirable to realize the benefit of some advantage which one compiler has over another, for example greater speed or additional optimization features.

A computer programmer may find that the set of source code files that compiles and runs successfully using one compiler may not execute properly when compiled with another one. That is, the executable program produced using one compiler runs fine and the executable program produced using another compiler crashes for the same set of source code files. Alternatively, the programmer may find that the set of source files compiles using one set of compilation options and does not compile with a different set of options. Typically the problem is caused by one source code file or the interaction of two or more source code files. The vast majority of the source code files will usually present no difficulty using either of the two interoperable compilers. The problem may be due to the source code itself or some unknown deficiency in the compiler. It may be possible and desirable to compile all of the source code files except the problematic file(s) on a preferred compiler and compile the problematic file(s) using a compiling environment that does not cause a problem.

To do this a computer programmer may need to determine which source code file or set of files is problematic. This process typically involves creating test executable programs made up of some source code files compiled using the functioning compiling environment and some source code files compiled using the problematic compiling environment and determining if the produced executable file runs properly. Through iterations of this process the computer programmer may be able to isolate the problematic source code file(s). This process requires a great deal of effort on the part of the computer programmer. The computer programmer must decide which set of files will be used to construct the test executable program and must determine if the test executable program experiences a failure or degradation in performance. The computer programmer, typically, may monitor the evaluation process and make decisions for each iteration of the debugging process.

BRIEF DESCRIPTION OF THE DRAWINGS

The present invention is illustrated by way of example and not limited by the figures of the accompanying drawings in which like references indicate similar elements and in which.

DETAILED DESCRIPTION

According to one aspect of the present invention, a method and system are provided to automate the process of isolating problematic source code files. The methodology that the problematic binary isolator uses to find a run time failure is similar to the way an expert debugger would attack the same problem. Because the tool systematically isolates the problem, it excludes the possibility of human error; thus it is more accurate. According to one embodiment of the present invention a method is provided to ascertain runtime failures caused by the interaction of two or more files.

Figure 1:
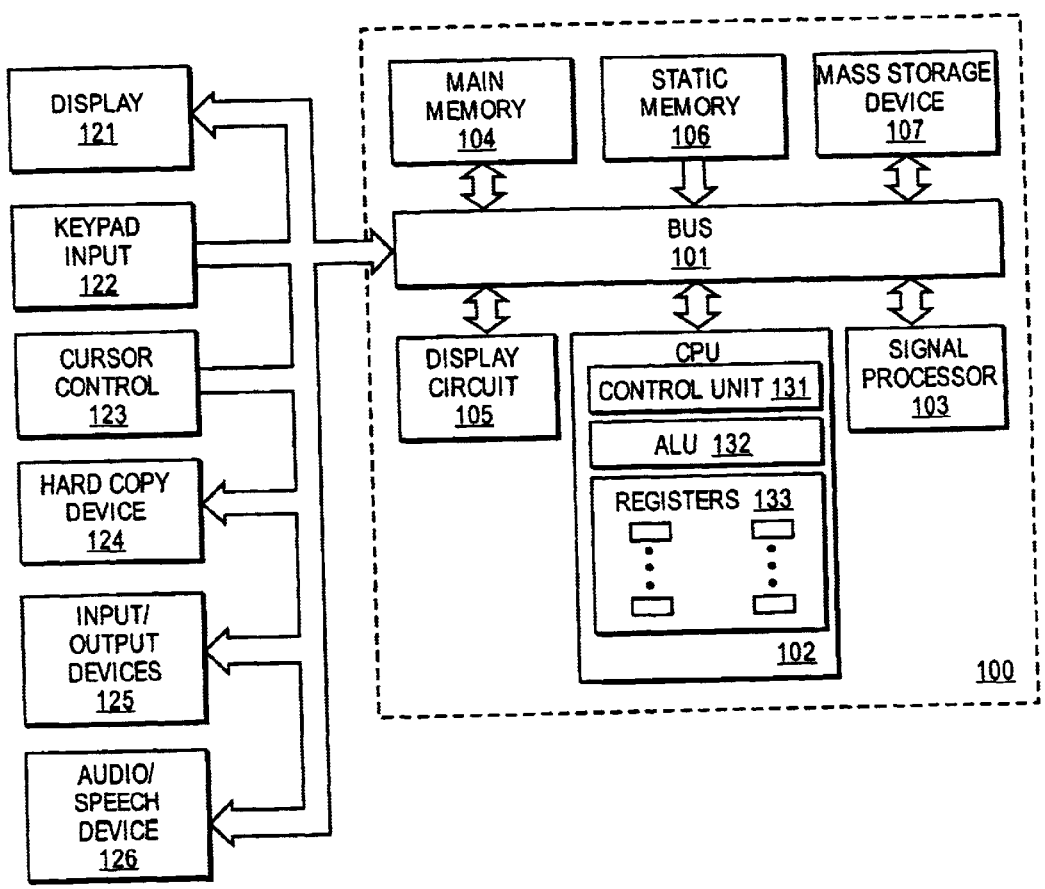
FIG. 1 is a diagram illustrating an exemplary digital processing system 100 for implementing the present invention.

FIG. 1 is a diagram illustrating an exemplary digital processing system 100 for implementing the present invention. The compilation, segregation, and evaluation of source code files described herein can be implemented and utilized within digital processing system 100, which can represent a general-purpose computer, portable computer, or other like device. The components of digital processing system 100 are exemplary in which one or more components can be omitted or added. For example, one or more memory devices can be utilized for digital processing system 100.

Referring to FIG. 1, digital processing system 100 includes a central processing unit 102 and a signal processor 103 coupled to a display circuit 105, main memory 104, static memory 106, and mass storage device 107 via bus 101. Digital processing system 100 can also be coupled to a display 121, keypad input 122, cursor control 123, hard copy device 124, input/output (I/O) devices 125, and audio/speech device 126 via bus 101.

Bus 101 is a standard system bus for communicating information and signals. CPU 102 and signal processor 103 are processing units for digital processing system 100. CPU 102 or signal processor 103 or both can be used to process information and/or signals for digital processing system 100. CPU 102 includes a control unit 131, an arithmetic logic unit (ALU) 132, and several registers 133, which are used to process information and signals. Signal processor 103 can also include similar components as CPU 102.

Main memory 104 can be, e.g., a random access memory (RAM) or some other dynamic storage device, for storing information or instructions (program code), which are used by CPU 102 or signal processor 103. Main memory 104 may store temporary variables or other intermediate information during execution of instructions by CPU 102 or signal processor 103. Static memory 106, can be, e.g., a read only memory (ROM) and/or other static storage devices, for storing information or instructions, which can also be used by CPU 102 or signal processor 103. Mass storage device 107 can be, e.g., a hard or floppy disk drive or optical disk drive, for storing information or instructions for digital processing system 100.

Display 121 can be, e.g., a cathode ray tube (CRT) or liquid crystal display (LCD). Display device 121 displays information or graphics to a user. Digital processing system 100 can interface with display 121 via display circuit 105. Keypad input 122 is a alphanumeric input device with an analog to digital converter. Cursor control 123 can be, e.g., a mouse, a trackball, or cursor direction keys, for controlling movement of an object on display 121. Hard copy device 124 can be, e.g., a laser printer, for printing information on paper, film, or some other like medium. A number of input/output devices 125 can be coupled to digital processing system 100. The automated process of isolating problematic source code files described herein can be implemented by hardware and/or software contained within digital processing system 100. For example, CPU 102 or signal processor 103 can execute code or instructions stored in a machine-readable medium, e.g., main memory 104.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Figure 2:
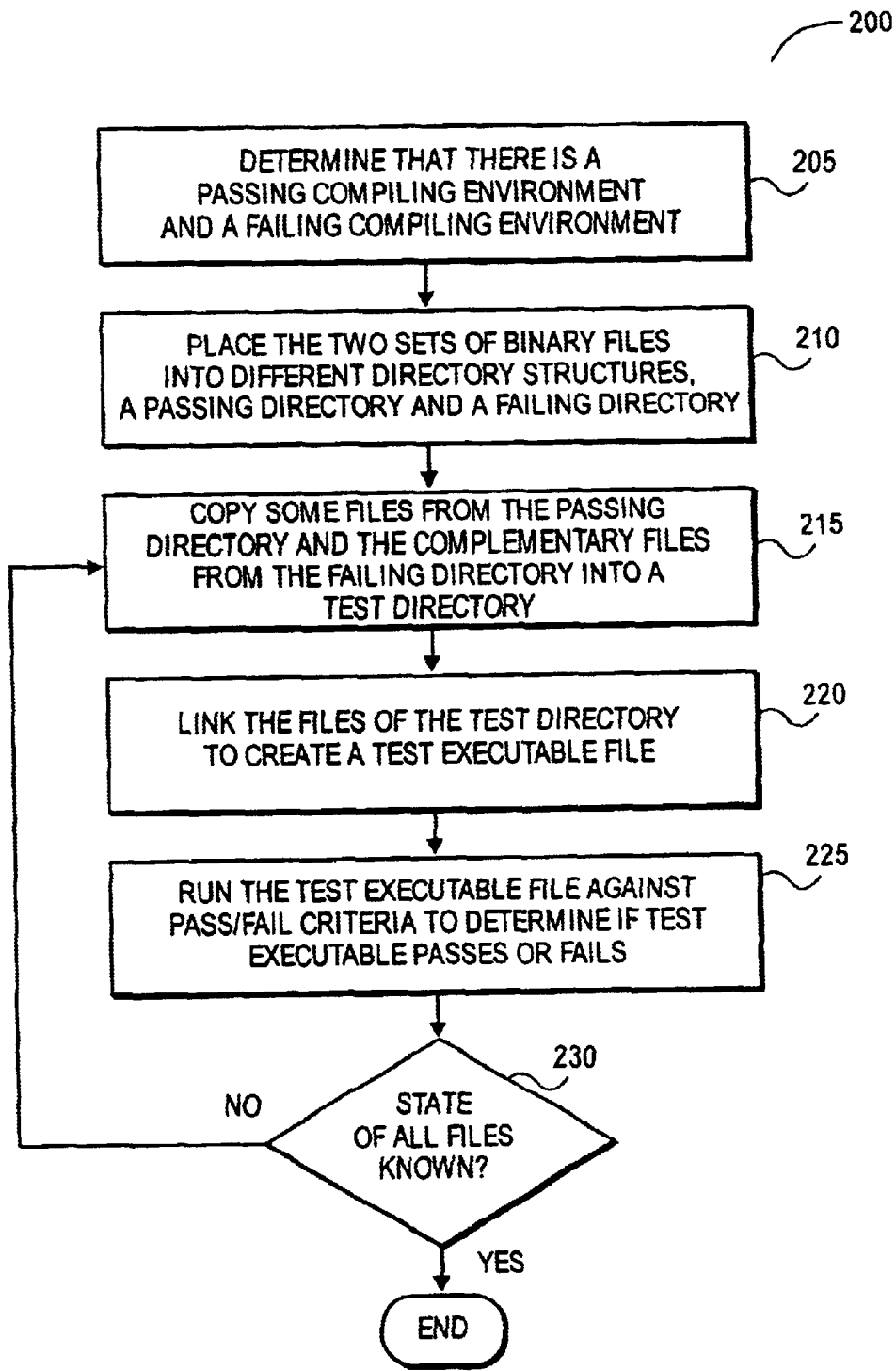
FIG. 2 is a process flow diagram according to one embodiment of the present invention.

FIG. 2 is a process flow diagram according to one embodiment of the present invention. Process 200, shown in FIG. 2 begins at operation 205 in which the system determines that one of two interoperable compiling environments produces a passing executable program and one produces a failing executable program. That is, the system determines that a set of source code files can be compiled using a given compiler to produce an executable program that has no runtime failures or performance problems (i.e., the executable program passes). The system also determines that the same source code files, compiled using another compiler or the same compiler with a different compilation mode, produce an executable program that experiences runtime failures or performance problems (i.e., the executable program fails).

At operation 210 the two sets of binary files, obtained through compiling the same source code files using different compiling environments are placed in different directories. The set of binary files that produce an executable program that does not exhibit run-time failure or performance degradation are placed in a passing directory (PD). The set of binary files that produce an executable program that exhibits run-time failure or performance degradation are placed in a failing directory (FD). At operation 215 some files are automatically selected from the PD and the complementary files are automatically selected from the FD. The selected files from each directory are copied to a separate directory called the test directory (TD). The files of the TD are then linked to create a test executable program at operation 220. Depending upon the type of files in the TD, linking may not be necessary. For example, if the files in the TD were dynamic link library (.dll) files, linking may not be necessary. At operation 225 the test executable program is run against pass/fail criteria. The output of the test executable program may be compared to model output. For example a text file from the test executable program may be compared to a model text file. A determination is made as to whether the test executable program passes or fails. If the test executable program passes then the system has determined that the files from the FD that make up the test executable may not be problematic. If the test executable program fails, the system has determined that the problematic file(s) is one of the files from the FD that make up the test executable program. The process is then automatically repeated from operation 215 using different, complementary combinations of files from the passing and failing directories. Through this process it is possible to determine which file or files is causing the run-time failure or performance problems. At operation 230 the process will continue if the state of each file has not been determined. The process ends at operation 235 when the state of each file is known. That is, after repeated iterations the system determines which files are problematic and which are not.

Figure 3A:
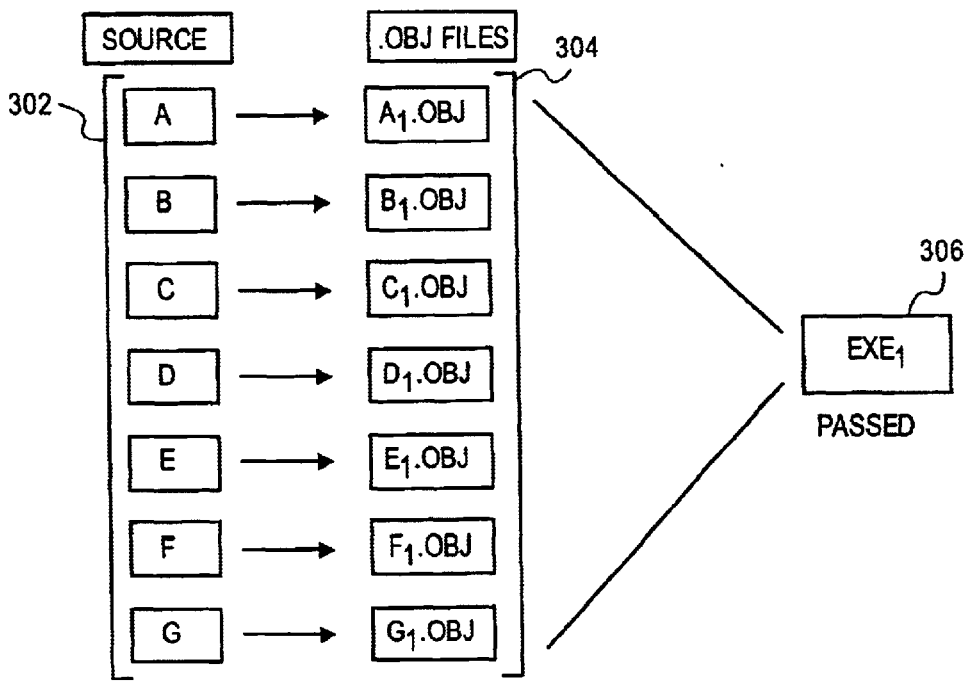
FIGS. 3A and 3B depict the selection of files and the creation of test executable programs in accordance with an embodiment of the present invention.
Figure 3A:
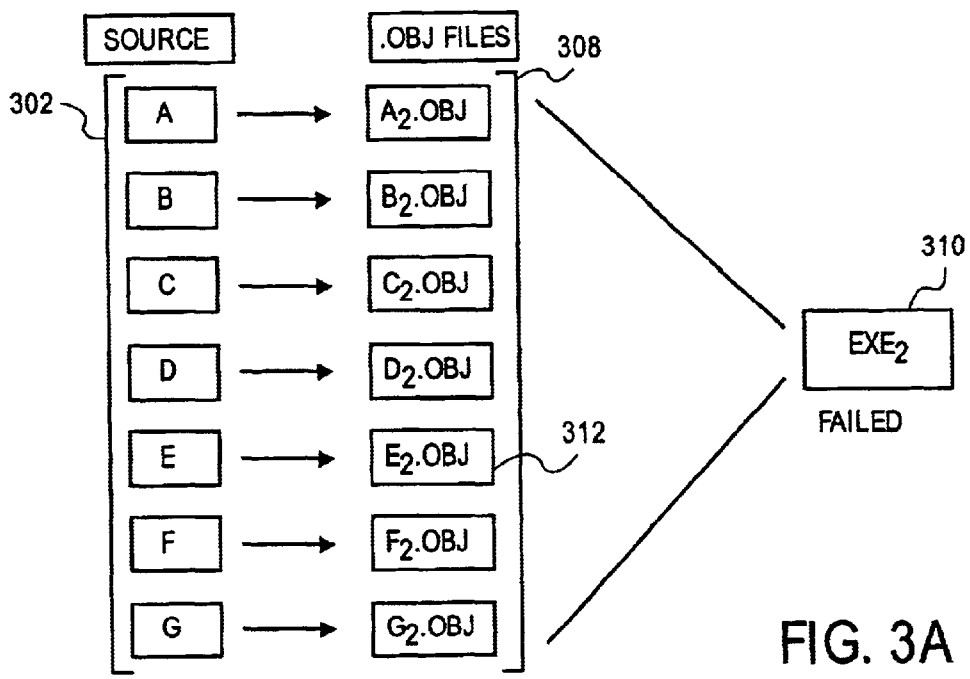
Figure 3B:
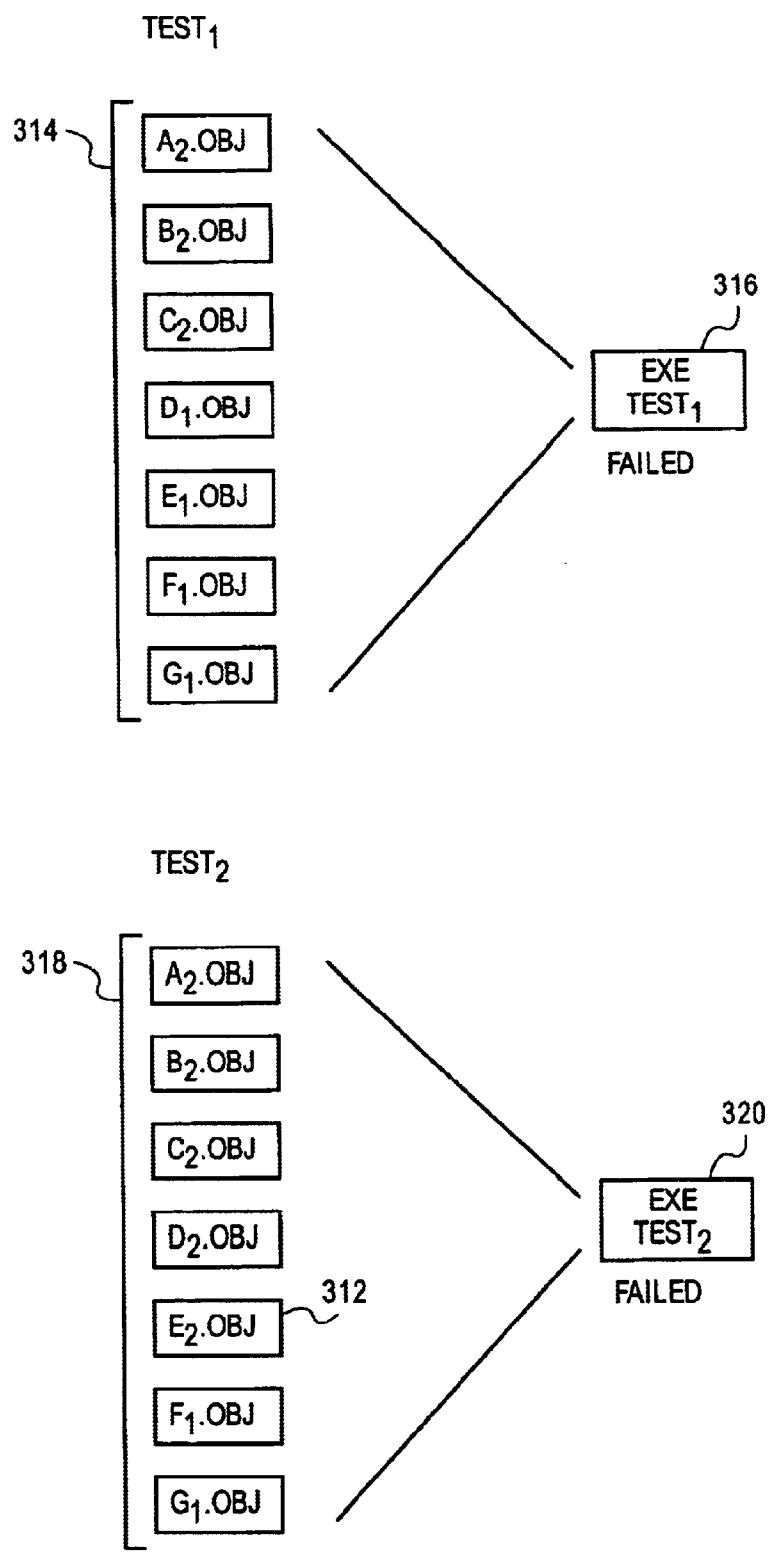

FIGS. 3A and 3B depict the selection of files and the creation of test executable programs in accordance with an embodiment of the present invention. FIG. 3A shows an exemplary set of source code files 302 labeled A through G. Typically, the number of source code files used is hundreds or thousands. In one embodiment source code files 302 are compiled using a first compiling environment. The compiling environment may be an Intel compiler available from Intel Corporation of Sunnyvale, Calif. The compiling of source code files 302 produces a set of object files 304 labeled $A_1$.obj through $G_1$.obj. Object files 304 are linked to create a passing executable program 306. Executable program 306 runs without runtime failures or performance problems. The same set of source code files (i.e., source code files 302) when compiled using a second compiling environment, interoperable with the first, produce a set of object files 308 labeled $A_2$.obj through $G_2$.obj. The second compiling environment may be a different compiler, for example, a Microsoft compiler available from Microsoft Corporation of Redmond, Wash., or alternatively could be a different mode of the first compiling environment. Object files 308, when linked, create a failing executable program 310 that exhibits runtime failure or performance degradation. A single source code file, due to a particular compiling environment, may cause such runtime failures or performance problems. Such problems may also be caused by the interaction of two or more source code files. For example, object file 312, labeled $E_2$.obj is the problematic file that has caused executable program 310 to fail.

FIG. 3B shows an object file test set 314 created in accordance with one embodiment of the present invention. In one embodiment the present invention creates an object file test set comprised of object files created through the failing compiler environment and the passing compiler environment as discussed above in reference to FIG. 2. Object file test set 314 contains object files $A_2$.obj, $B_2$.obj, and $C_2$.obj selected from the set of object files 308 that produced failing executable program 310 as well as object files $D_1$.obj, $E_1$.obj, $F_1$.obj, and $G_1$.obj selected from the set of object files 304 that produced passing executable program 306. Because object file test set 314 does not contain the problematic file $E_2$.obj, the executable program 316 created by linking the files of object file test set 314 does not exhibit the problematic behavior. Because an executable program 316, created by linking a set of object files 314 that included files $A_2$.obj, $B_2$.obj, and $C_2$.obj, did not exhibit problematic behavior, the system has now determined that the set of files $A_2$.obj, $B_2$.obj, and $C_2$.obj does not contain the problematic file. One of these files interacting with other files may be the source of the runtime failure or performance problem, as discussed below, but for purposes of this example, the system has eliminated these files as suspect problematic files.

The system then creates another object file test set 318 that contains additional files from the set of object files 308 (e.g., object files test set 318 contains $A_2$.obj, $B_2$.obj, $C_2$.obj $D_2$.obj, $E_2$.obj, $F_1$.obj, and $G_1$.obj). Because object file test set 318 contains the problematic file $E_2$.obj, the executable program 320 created by linking the files of object file test set 318 exhibits the problematic behavior.

Through an iterative process the system of the present invention may determine the state of all files and thus determine the problematic file(s).

In a more complex example, as referred to above, the interaction of two or more files is the source of the runtime failure or performance problem. In a preferred embodiment the present invention employs a search algorithm as described in pseudo code in Appendix A. The algorithm of Appendix A can be employed not only to ascertain a problematic file, but also to ascertain the problematic interaction of two or more files. The caller of the search algorithm enumerates the suspect files, which may be all of the files. The caller creates two Boolean arrays of size N, where N is the number of suspect files. One array is the current state array which is used internally by the search algorithm to represent the current configuration of binary files that is being tested. The other array is the answer array which is initialized to passing. As each problematic file is found by the search algorithm, the corresponding element of the answer array is changed to failing. Upon completion of the search algorithm, each failing element of the answer array represents a problematic binary file.

Figure 4:
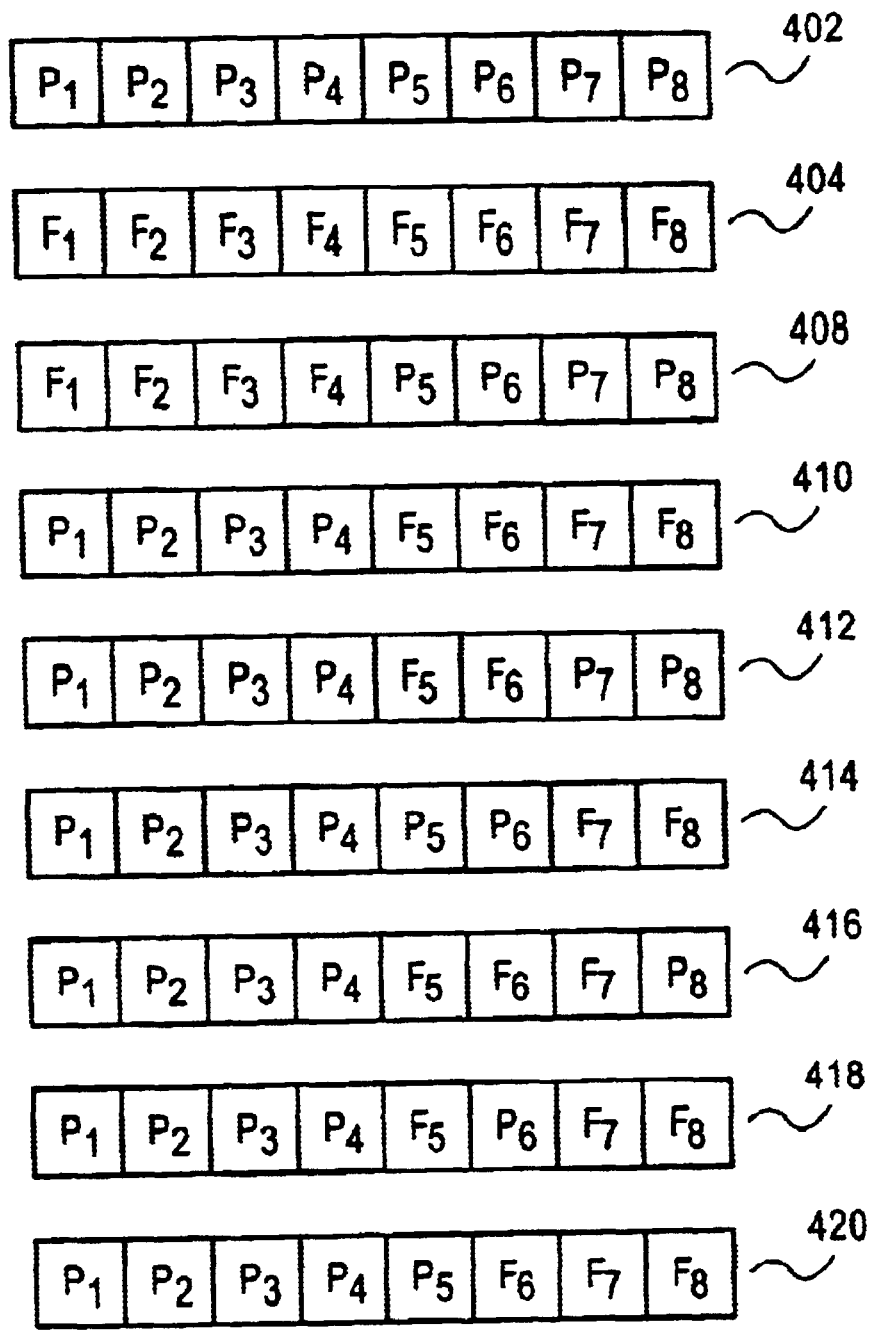
FIG. 4 depicts an example of the file selecting process of one embodiment of the present invention.

FIG. 4 depicts an example of the process of selecting files employing the algorithm of Appendix A. A file set 402, created by compiling source code files using a "passing" compiling environment exhibits no problematic behavior (i.e., it passes). File set 402 contains files $P_1$ through $P_8$. A file set 404 created from the same source code using a "failing" compiling environment exhibits problematic behavior such as runtime failure or performance problems (i.e., it fails). File set 404 contains files $F_1$ through $F_8$. For purposes of example, the problematic behavior of file set 404 is caused by the interaction of files $F_6$ and $F_7$ when compiled using the "failing" compiling environment. In other words, the resulting executable program exhibits problematic behavior, if, and only if, both files $F_6$ and $F_7$ are present in the file set. In a first iteration, the system creates a test file set 408 consisting of the first half of the files from the failing file set 404 (i.e., files $F_1$–$F_4$) and the second half of the files from the passing set 402 (i.e., $P_5$–$P_8$). The interaction of files $F_6$ and $F_7$ is not present in file set 408 so file set 408 does not exhibit problematic behavior. The system then creates a test file set 410 consisting of the first half of the files from the passing file set 402 (i.e., files $P_1$–$P_4$) and the second half of the failing set 402 (i.e., $F_5$–$F_8$). The interaction of files $F_6$ and $F_7$ is present in file set 410 so file set 410 exhibits problematic behavior. The system has now determined that the problematic file(s) exist in files $F_5$–$F_8$. Therefore, files $P_1$–$P_4$ will be used as the first half of subsequent test file sets.

Test file set 412 consists of $P_1$–$P_4$, $F_5$, $F_6$, $P_7$, and $P_8$. The first half of test file set 412 consists of the first four passing files $P_1$–$P_4$. Of the files still to be evaluated (i.e. the $5^{th}$ through $8^{th}$ files), the first half are failing files $F_5$ and $F_6$ and the second half are passing files $P_7$ and $P_8$. Because test file set 412 does not contain the interaction of files $F_6$ and $F_7$ it passes. Test file set 414 reverses the order of the passing and failing files (i.e., $P_5$ and $P_6$ are included with $F_7$ and $F_8$). Test file set 414 likewise passes, as it does not contain the interaction of $F_6$ and $F_7$. This fact alerts the system that the problem is not due to an individual file, but due to the interaction of two or more of the files $F_5$ through $F_8$.

Because the problematic behavior is caused by the interaction of two or more files, the first half of the files still to be evaluated are failing files, $F_5$ and $F_6$ and the first half of the remaining files are failing files, $F_7$. Test file set 416 is created using $F_5$, $F_6$, $F_7$ and $P_8$. Test file set 416 checks the interaction between $F_5$ and $F_7$ and the interaction between $F_6$ and $F_7$, as well as the interaction of $F_5$, $F_6$ and $F_7$. Because this includes the interaction between $F_6$ and $F_7$, test file set 416 fails. The failure of test file set 416 shows that the interaction of $F_5$ and $F_7$ or the interaction of $F_6$ and $F_7$, or the interaction of $F_5$, $F_6$, and $F_7$ is problematic. If test file set 416 had passed, this would eliminate the interaction the interaction of $F_5$ and $F_7$, the interaction of $F_6$ and $F_7$, and the interaction of $F_5$, $F_6$, and $F_7$ as possible problematic interactions.

Test file set 418 is created as described above and contains $F_5$, $P_6$, $F_7$, and $P_8$. Test file set 418 passes because it does not contain the interaction of $F_6$ and $F_7$. Test file set 418 eliminates the interaction of $F_5$ and $F_7$ as a source of the problematic behavior. The process is continued with the creation of test file set 420 containing $P_5$, $F_6$, $F_7$, and $F_8$. Test file set 420 contains the interaction of $F_6$ and $F_7$ and therefore fails. This iteration shows that the interaction of $F_6$ and $F_7$ is sufficient to cause failure.

The system has now ascertained that files $F_6$ and $F_7$ when compiled together cause a runtime failure or performance problem for a given compiling environment (i.e., the "failing" compiling environment). A computer programmer may now compile one or both of files $F_6$ and $F_7$ using a "passing" compiling environment. The remainder of the files may be compiled using the "failing" compiling environment in order to take advantage, to the extent possible, of such a compiling environment. Alternatively, the information generated by the system may be used to debug the problematic file(s) and eliminate the source of the problematic behavior.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

APPENDIX A

```
procedure search (start, end, count, state, answer)
    integer start, end, count
    boolean state[]
    boolean answer[]
begin
    integer middle, i
    // If the search has been narrowed to a single file,
    // then the faulty file has been found
    if start = end then
        answer[start] := FAILING
        return
    fi
    // Divide the search area into 2 halves
    middle := (start + end) / 2
    // First try with the 1st half failing and the 2nd half passing
    for i := start to end do
        if i ≤ middle then
            state[i] := FAILING
        else
            state[i] := PASSING
        fi
    od
    // If it failed, call search again with the 2nd half passing
    if query(state, count) = FAIL then
        search(begin, middle, count, state, answer)
        return
    fi
```

APPENDIX A-continued

```
// Now try with the 2nd half failing
for i := start to end do
    if i ≤ middle then
        state[i] := PASSING
    else
        state[i] := FAILING
    fi
od
// If it failed, call search again with the 1st half passing
if query(state, count) = FAIL then
    search(middle + 1, end, count, state, answer)
    return
fi
// Both of them passed. There must be an interaction between a file
// in the 1st half and a file in the 2nd half. Call search twice -
// once with the 1st half failing, once with the 2nd half failing.
for i = start to middle do
    state[i] := FAILING
od
search(middle + 1, end, count, state, answer)
for i = middle + 1 to end do
    state[i] = FAILING
od
search(start, middle, count, state, answer);
end
```

We claim:

1. A method comprising:

creating failing binary files through use of a failing compiling environment;

creating passing binary files through use of a passing compiling environment, the passing compiling environment interoperable with the failing compiling environment;

assigning a group of failing binary files and a complementary group of passing binary files to a test directory;

linking the files in the test directory to create a test executable program;

determining if the text executable program passes or fails; and automatically repeating the assigning, linking, and determining to determine the state of all binary files such that a file or set of files causing the test executable program to fail is determined.

2. The method of claim 1, wherein assigning is accomplished through use of an algorithm.

3. The method of claim 2, wherein the algorithm determines the interaction of two or more binary files causing the test executable program to fail.

4. The method of claim 1, wherein determining if the test executable program passes or fails includes comparing output of the test executable program to model output.

5. The method of claim 1, wherein the failing compiling environment and the passing compiling environment are different modes of a compiler.

6. A machine-readable medium that provides executable instructions, which when executed by a processor, cause said processor to perform a method comprising:

creating failing binary files through use of a failing compiling environment;

creating passing binary files through use of a passing compiling environment, the passing compiling environment interoperable with the failing compiling environment;

assigning a group of failing binary files and a complementary group of passing binary files to a test directory;

linking the files in the test directory to create a test executable program;

determining if the text executable program passes or fails; and automatically repeating the assigning, linking, and determining, to determine the state of all binary files such that a file or set of files causing the test executable program to fail is determined.

7. The machine-readable medium of claim 6, wherein assigning is accomplished through use of an algorithm.

8. The machine-readable medium of claim 7, wherein the algorithm determines the interaction of two or more binary files causing the test executable program to fail.

9. The machine-readable medium of claim 6, wherein determining if the test executable program passes or fails includes comparing output of the test executable program to model output.

10. The machine-readable medium of claim 6, wherein the failing compiling environment and the passing compiling environment are different modes of a compiler.

11. An apparatus comprising:

means for creating failing binary files through use of a failing compiling environment;

means for creating passing binary files through use of a passing compiling environment, the passing compiling environment interoperable with the failing compiling environment;

means for assigning a group of failing binary files and a complementary group of passing binary files to a test directory;

means for linking the files in the test directory to create a test executable program;

means for determining if the text executable program passes or fails; and means for automatically repeating the assigning, linking, and determining to determine the state of all binary files such that a file or set of files causing the test executable program to fail is determined.

12. The apparatus of claim 11, wherein assigning is accomplished through use of an algorithm.

13. The apparatus of claim 12, wherein the algorithm determines the interaction of two or more binary files causing the test executable program to fail.

14. The apparatus of claim 11, wherein determining if the test executable program passes or fails includes comparing output of the test executable program to model output.

15. The apparatus of claim 10, wherein the failing compiling environment and the passing compiling environment are different modes of a compiler.

* * * * *